United States Patent [19]

Lewis

[11] 4,092,388

[45] May 30, 1978

[54] APPARATUS AND PROCESS FOR MANUFACTURE OF VARIEGATED SOAP BARS

[75] Inventor: William Platt Lewis, West Chester, Ohio

[73] Assignee: The Procter & Gamble Company, Cincinnati, Ohio

[21] Appl. No.: 738,782

[22] Filed: Nov. 3, 1976

[51] Int. Cl.$^2$ .................................................. B29F 3/12

[52] U.S. Cl. ...................................... 264/75; 252/367; 252/371; 264/211; 264/245; 425/131.1; 425/376 R

[58] Field of Search ................... 264/75, 73, 245, 211, 264/176 R; 425/131.1, 376 R; 252/367-371

[56] References Cited

U.S. PATENT DOCUMENTS

| | | | |
|---|---|---|---|
| 2,466,934 | 4/1949 | Dellenbarger | 425/376 R |
| 2,962,786 | 12/1960 | Hawk, Sr. et al. | 425/131.1 |
| 2,994,460 | 8/1961 | Matthews | 222/145 |
| 3,148,412 | 9/1964 | Spreeuwers | 264/349 |
| 3,673,294 | 6/1972 | Matthaei | 264/75 |
| 3,940,220 | 2/1976 | D'Arcangeli | 425/131.1 |
| 3,979,107 | 9/1976 | Lesk | 264/349 |
| 3,993,722 | 11/1976 | Borcher et al. | 264/75 |

FOREIGN PATENT DOCUMENTS

| | | |
|---|---|---|
| 584,141 | 3/1962 | Italy. |
| 47-3619 | 1/1972 | Japan. |

*Primary Examiner*—Jeffery R. Thurlow
*Attorney, Agent, or Firm*—Ronald L. Hemingway; Richard C. Witte

[57] ABSTRACT

In manufacture of variegated soap bars, noodles are choke fed into the final plodder through an opening communicating essentially only with a portion of the worm of the plodder which turns downwardly.

13 Claims, 8 Drawing Figures

APPARATUS AND PROCESS FOR MANUFACTURE OF VARIEGATED SOAP BARS

BACKGROUND OF THE INVENTION

This invention relates to apparatus and process for manufacture of variegated soap bars.

Soap bars having color patterns (e.g. marbleization, striation, mottling), referred to herein as variegated soap bars, have been manufactured for many years. Such manufacture often includes use of soap noodles with some of the noodles being of one color and some of the noodles being of a second color. Traditionally, there has been a problem in obtaining uniform appearance soap bars in such manufacture.

Commonly assigned U.S. Pat. No. 3,993,772, Borcher et al., issued Nov. 23, 1976, is addressed to solving such problem. The invention of that patent requires use of a narrow range of noodle sizes and ratios of sizes which are not always convenient or desirable. Moreover, manufacture in accordance with that invention sometimes results in bars having a smeared appearance or having a rather bold color tone which most consumers like less than a muted color tone.

It is an object of this invention to provide apparatus and process for manufacturing variegated soap bars whereby color appearance variation from bar to bar is minimized without the need for utilizing narrow ranges of noodle sizes and ratios of sizes and where in general there is less sensitivity to process conditions and therefore less need for operator control in relation to producing bars of muted unsmeared color appearance.

BRIEF DESCRIPTION OF THE INVENTION

The above advantage is obtained herein by use of apparatus comprising:

(a) means to form soap noodles of one color;

(b) means to form soap noodles of a second color;

(c) means to receive noodles from means (a) and means (b) to form either (i) a common stream of noodles or (ii) side-by-side streams of noodles with each stream of the side-by-side streams being of noodles of one of the colors;

(d) plodder means having a rotatable worm to process the noodles into a variegated soap log;

(e) means for forming the soap log into variegated soap bars;

(f) means for receiving noodles from the means (c) and providing at least one bed of noodles for choke feeding of the plodder means and having outlet means for communicating essentially only with a portion of the worm of the plodder means which turns downwardly on rotation of such worm (that is, having outlet means to provide a feed stream only onto a portion of the worm of the plodder means which turns downwardly on rotation of such worm).

In a preferred embodiment, the means (c) comprises conduit means and means are provided in said conduit means to mingle the noodles of one color with the noodles of the second color to provide a bed of noodles of the one color intermingled with noodles of the second color.

In an embodiment where side-by-side streams of noodles are formed, the means (f) includes divider means which extends in a longitudinal direction to form side-by-side channels into the plodder means with one of the channels functioning to receive noodles from means (a) and the other of the channels functioning to receive noodles from means (b).

In each embodiment, the means (f) functions to restrict motion of noodles in each bed. Preferably, the means (f) functions to restrict lateral and longitudinal motion in each bed and also to minimize or substantially eliminate regurgitation and noodle breakage.

The invention does not encompass means feeding a stream of noodles of one color back of a stream of noodles of the second color to provide a bed or beds of noodles with noodles of one color back of noodles of the second color (the relative positions being considered in relation to the machine direction of the plodder means); such apparatus produces a cycling effect with the relative amounts of each color soap differing from bar to bar — this is considered unacceptable from a quality control standpoint.

The objects and advantages of the invention will be evident from the following detailed description.

DETAILED DESCRIPTION

Figure 1:
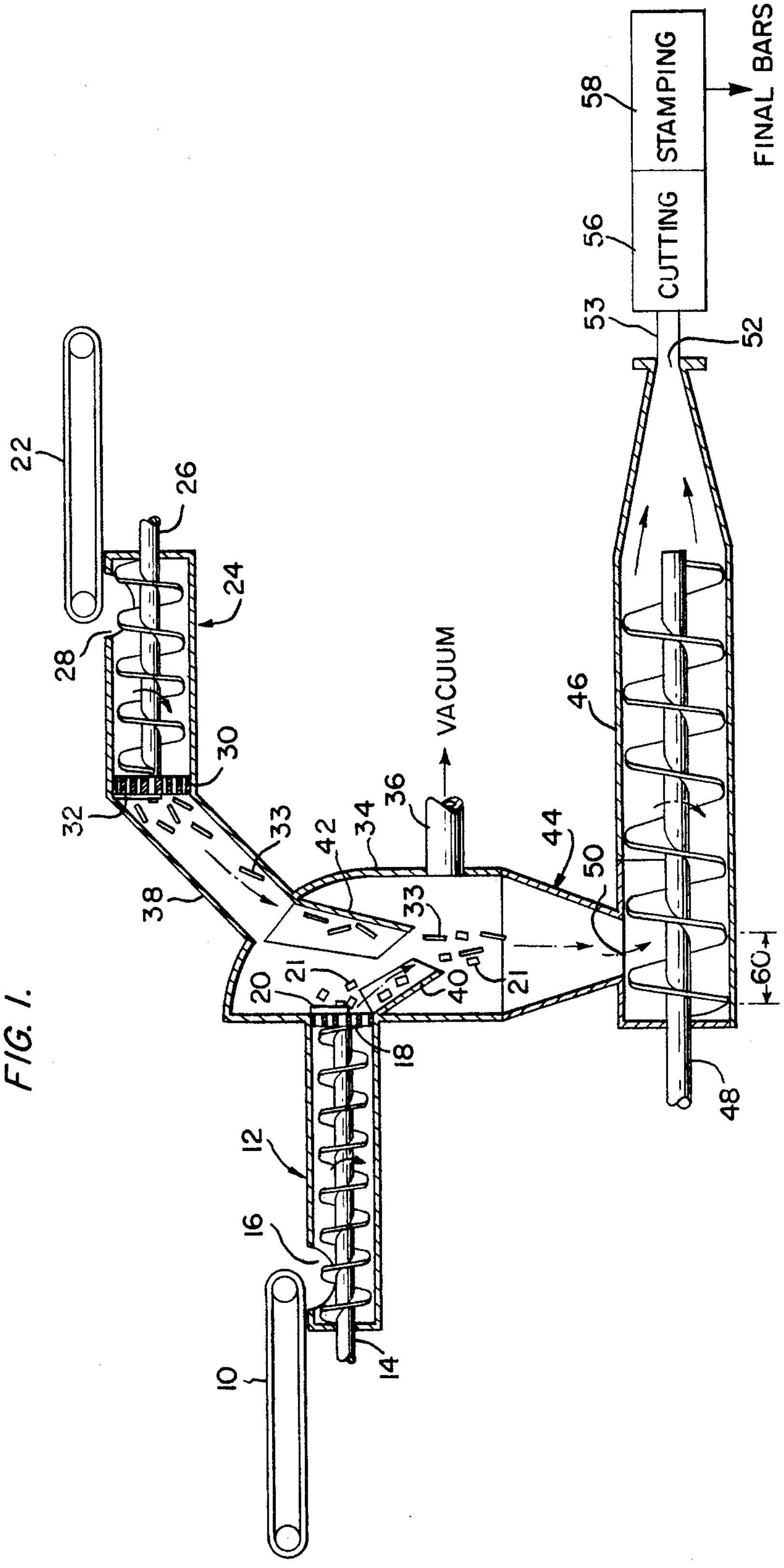
FIG. 1 schematically illustrates preferred apparatus and process within the scope of the present invention.

Continuing references is made to FIG. 1 of the drawings.

A feed conveyor 10, denoted a rate control adjuster, acts in combination with a preplodder 12 to form soap noodles of one color.

The preplodder 12 has an inlet 16 at one end and an outlet at the other end. It is equipped with a worm 14 adapted to rotate in a clockwise direction (looking in the direction of the outlet end). It has preforated plate 18 equipped with knife edge 20 at its outlet end. The knife edge 20 is adapted to rotate adjacent the outer surface of the plate 18. The feed conveyor 10 is adapted to feed a soap mass into the inlet 16.

A feed conveyor 22, denoted a rate control adjuster, acts in combination with a preplodder 24 to form soap noodles of a second color.

The preplodder 24 has an inlet 28 at one end and an outlet at the other end. It is equipped with a worm 26 adapted to rotate in a counterclockwise direction (looking in the direction of the outlet end). It has a perforated plate 30 equipped with a knife edge 32 at its outlet end. The knife edge 32 is adapted to rotate adjacent the outer surface of plate 30. The feed conveyor 22 is adapted to feed a soap mass into inlet 28.

The outlet end of the preplodder 12 communicates with a main feed conduit 34 which is known in the art as a vacuum chamber. The conduit 34 communicates with a conduit 36 for drawing a vacuum on conduit 34.

A conduit 38 provides communication between the outlet of preplodder 24 and main conduit 34.

A chute 40 is mounted and positioned within conduit 34 to receive noodles from preplodder 12 and guide them centrally of the conduit 34.

A chute 42 is mounted and positioned within conduit 34 to receive noodles from conduit 38 (which in turn receives noodles from preplodder 24) and guide them centrally of conduit 34.

The chutes coact to form a common stream of noodles as hereinafter described.

A hopper 44 communicates with main conduit 34 and functions to receive the noodles from chutes 40 and 42.

A final plodder 46 communicates with hopper 44 to receive noodles therefrom. It has an inlet at one end which communicates with an outlet 50 of the hopper 44. (The inlet into the plodder 46 and the outlet from hopper 44 are essentially coextensive). It has an outlet 52 at the other end. It is equipped with a worm 48 adapted to rotate in clockwise direction (looking in the direction of the outlet end).

Figure 2:
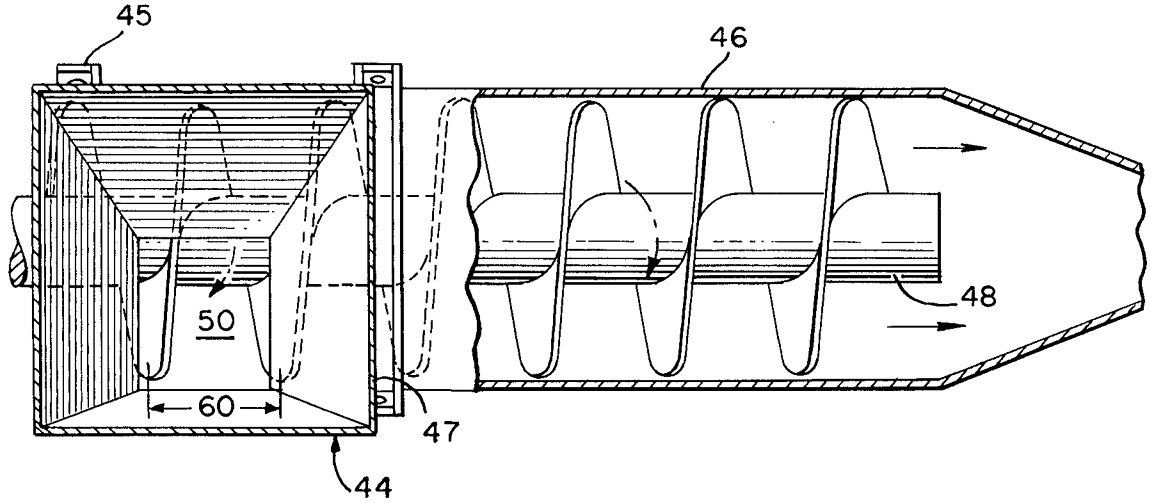
FIG. 2 is a plan view partly broken away illustrating preferred apparatus for feeding the plodder means including a hopper and a shroud for attaching the hopper and the plodder means.
Figure 3:
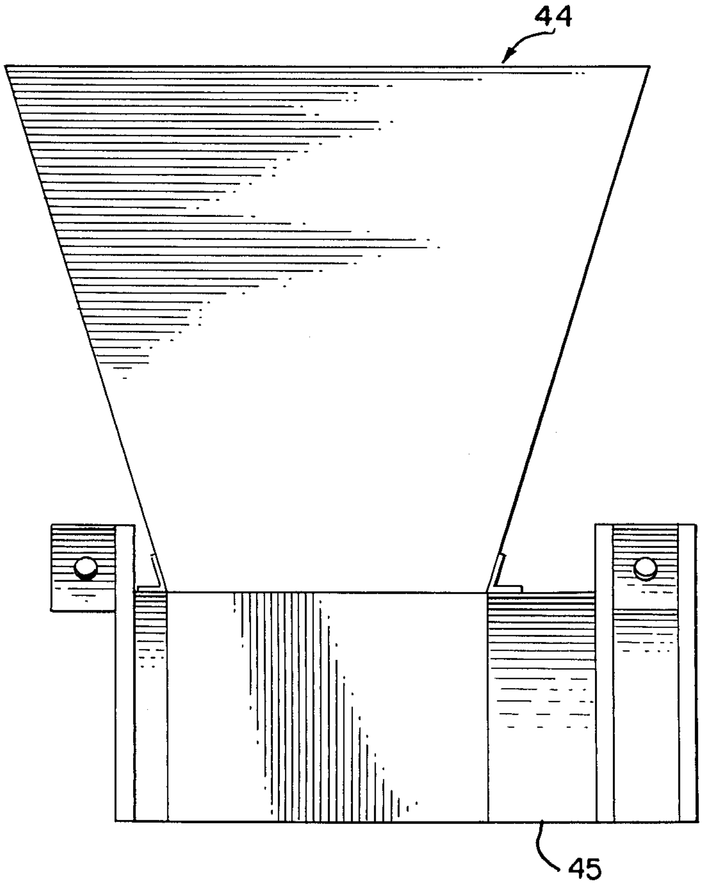
FIG. 3 is a side elevational view of the hopper and shroud depicted in FIG. 2.
Figure 5:
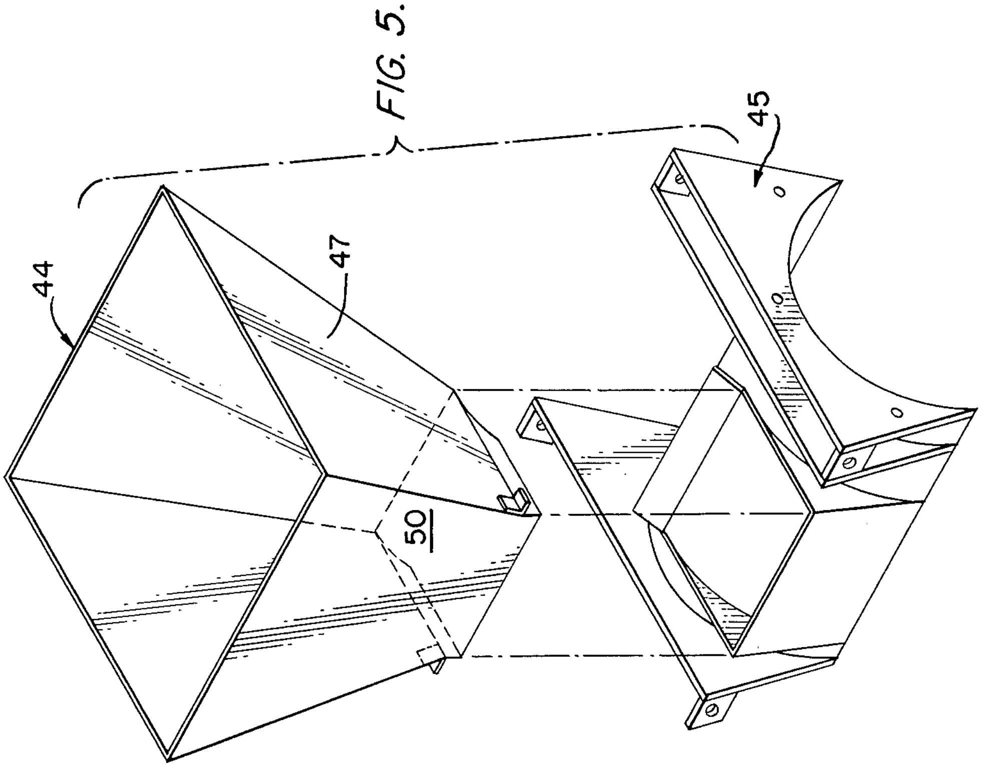
FIG. 5 is an exploded perspective view of the hopper and shroud depicted in FIG. 2.
Figure 4:
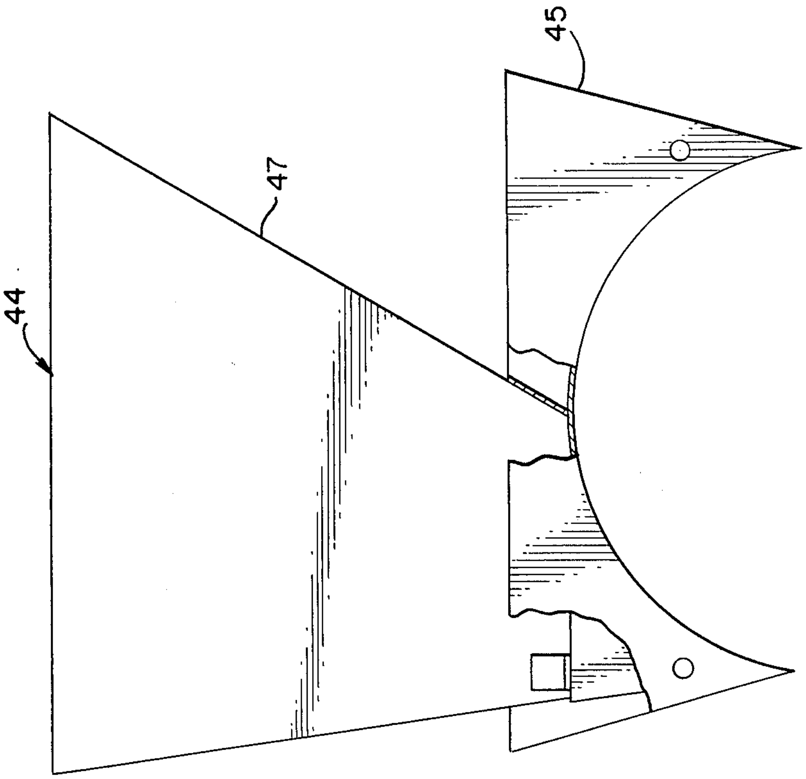
FIG. 4 is a front elevational view partly in section of the hopper and shroud depicted in FIG. 2.

FIG. 2 depicts the outlet 50 of the hopper 44 and its relative size and positioning with respect to the final plodder 46 which is an important feature of this invention. As indicated in FIG. 2, the outlet 50 of the hopper 44 provides communication essentially only with a portion of the worm 48 of the final plodder means 46 which turns downwardly on rotation of such worm.

Turning back to FIG. 1, the final plodder 46 is followed by a cutting means 56.

A stamping means 58 follows.

We turn now to a more detailed description of the preferred apparatus.

The preplodders 12 and 24 typically have worm diameters ranging from about 6 to about 16 inches. The plates 18 and 30 can have perforations (holes) with diameters ranging from about 1/32 of an inch to about 1 inch, preferably from about 1/16 of an inch to about ¾ of an inch and optimally from about ⅛ of an inch to about ½ inch. Such perforations typically have lengths from about 1/16 inch to about 1 inch. The plates 18 and 30 are each normally provided with from about 10 to about 2500 perforations (about 5 to about 50% open area in each plate). Normally, each of the holes in each plate has about the same diameter. Although circular holes are preferred, other shape holes can be employed, for example, rectangular, oblong or star shaped holes. In the case of non-circular holes, the ranges given for diameters refer instead to the largest cross-sectional dimension.

In FIGS. 2–5, the hopper 44 is depicted as including a shroud 45 which functions to attach the hopper 44 and the final plodder 46. The hopper is oriented so that hopper wall 47 is the front wall (see FIGS. 2, 4 and 5).

The shroud 45 in the depicted apparatus also serves the function of surrounding a portion of the worm of the plodder 46; this function is carried out because the plodder 46 as depicted is conventional ordinarily having an inlet which is too large for the practice of the present invention. The shroud can be eliminated if a final plodder 46 is manufactured for use in this invention so as to have an inlet opening positioned and of a size to accommodate this invention. In such case, the hopper can be attached at the inlet of the final plodder, for example, by wedging or welding or the like.

As indicated previously, it is very important herein that the opening of outlet 50 for feeding into the final plodder 46 be designed to communicate essentially only with a portion of the worm of the plodder which turns downwardly on rotation of such worm. Thus, the opening should have a dimension in the cross machine direction in respect to the plodder of no more than about 1.1 times the radial dimension of the worm. Generally, this opening should have a dimension in the cross machine direction in respect to the plodder means of at least about ½ the radial dimension of the worm. The lower limit is selected to provide a sufficient amount of feed area so as to minimize the danger of clogging in the restricted opening of outlet 50. The upper limit is selected to obtain the advantageous results described above. The opening typically has a dimension in the machine direction in respect to the plodder means ranging from about ½ the flight distance to about twice the flight distance (the term "flight distance" is used herein to mean the distance between successive corresponding points on the blade (or thread) of the worm, in other words, the dimension 60 as shown in FIGS. 1 and 2). Preferably the opening is in the form of a right parallelogram and more preferably in the form of a rectangle. Most preferably the hopper outlet into the plodder is positioned and dimensioned so as to provide a feed stream into the plodder having a horizontal cross section which is rectangular and has a dimension in the feed direction of the plodder of 1 times the flight distance and a dimension in the cross machine direction of the plodder equal to the radial dimension of the worm.

Typically, the plodder 46 has a worm diameter ranging from about 14 inches to about 16½ inches, a flight distance on the worm ranging from about 6 inches to about 12 inches, and a barrel length ranging from about 4 feet to about 6 feet.

Figure 6:
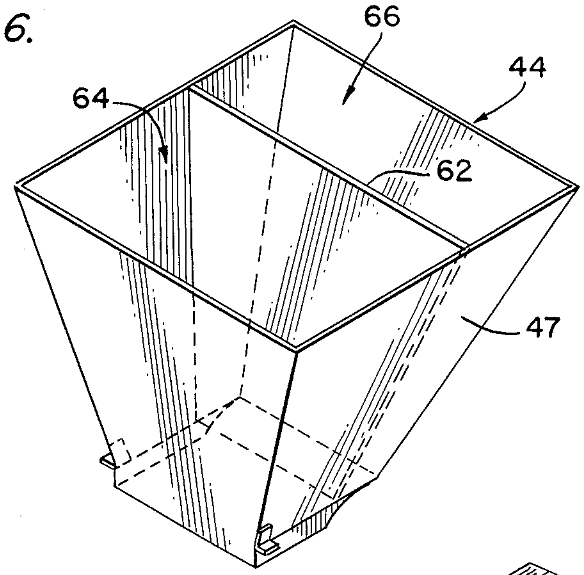
FIG. 6 is a perspective view of a hopper for an embodiment of the invention including divider means to form side-by-side channels into the plodder means.

Having described preferred apparatus within the scope of the invention, we turn now to different apparatus within the scope of the invention as depicted in FIG. 6. In this embodiment, the hopper 44 includes a divider member 62 which extends in a longitudinal direction (that is in the same direction as the machine direction of final plodder 46; in this regard note the orientation of the divider 62 with respect to the front hopper wall 47) to form side-by-side channels 64 and 66 into plodder means 46 with channel 64 functioning to receive noodles from one of the preplodders and channel 66 functioning to receive noodles from the other of the preplodders. Preferably, the channels are dimensioned so that the ratio obtained by dividing the horizontal cross-sectional area of channel 64 by the horizontal cross-sectional area of channel 66 is equal to the ratio obtained by dividing the feed rate to (and from) channel 64 by the feed rate to (and from) channel 66. For this embodiment, the chutes 40 and 42 as depicted in FIG. 1 are designed and positioned so that the noodles of the different colors will remain segregated and so that noodles of only one particular color will be fed into one particular channel.

We turn now to a description of a process carried out in the preferred apparatus described in conjunction with FIGS. 1–5.

A first color soap mass is conveyed by rate control adjuster 10 into the inlet 16 of preplodder 12. Worm 14 is rotated and acts to compact such soap mass and extrudes it through the holes in plate 18. The soap mass exits from the holes in plate 18, for example, in the form of cylinders. These cylinders are cut into noodles, for example by rotation of knife edge 20. Typical noodles produced as a result of such processing are indicated by reference numeral 21 in FIG. 1.

A soap mass of a second color is conveyed by rate control adjuster 22 into the inlet 28 of preplodder 24. Worm 26 is rotated and acts to compact such soap mass and extrudes it through the holes in plate 30. The soap mass exits from the holes in plate 30, for example in the form of cylinders. These cylinders are cut into noodles, for example, by rotation of knife edge 32. Typical noodles produced as a result of such processing are indicated by reference numeral 33 in FIG. 1.

The soap masses for processing in each of the preplodders 12 and 24 can be in the form of pellets, billets, flakes, chips, filiments, chunks, shavings or other suitable preplodding form. Preferably, one of the soap masses is white in color, and the other is blue or green.

The soap masses entering the preplodder 12 and 24 normally have a temperature ranging from about 75° to about 105° F. The temperature of the soap mass in a preplodder is typically maintained at within this same temperature range; however, temperatures have risen within the preplodders to 115° F or higher without deleterious result. The temperatures within a preplodder are controlled by circulating suitable coolant, for example brine, through the preplodder barrel. Preferably the temperature differential between the soap masses in the two preplodders is 10° F or less; however, processing has been carried out at temperature differentials of 15° F and higher without deleterious result.

The noodles produced as a result of cutting by knife edges 20 and 32, that is the noodles produced by each preplodder, perforated plate, cutting knife assembly, typically are in the form of cylinders and have diameters ranging from about 1/32 of an inch to about 1 inch, preferably from about 1/16 of an inch to about ¾ of an inch and optimally from about ⅛ of an inch to about ½ inch. When the noodles are in forms other than cylindrical, for example with cross sections that are rectangular or oblong or star shaped, the largest cross-sectional dimension should fall within the range of values given above for diameters. Typically, the noodles have lengths ranging from about ¼ inch to about 2½ inches with lengths ranging from about ½ inch to about 2 inches being preferred. The noodles of the different colors can be of the same size or of different sizes and no particular size or ratio of sizes is important or critical within the framework of this invention.

Typically, the preplodders are fed and utilized to produce noodles so that the weight ratio of noodles of one of the colors to noodles of the other of the colors does not exceed about 10:1, this is because at weight ratios in the range of 10:1 to 20:1, variegation effect diminishes and is eventually lost.

The noodles 21 enter main conduit 34 and are guided by chute 40 and the noodles 33 enter main conduit 34 and are guided by chute 42 to mingle the noodles and form a common stream in main conduit 34 with the noodles in that stream consisting of noodles of one color intermingled with noodles of the second color.

As previously indicated the main conduit 34 is typically described as a vacuum chamber and means 36 is provided to draw a vacuum on that chamber if desired. Vacuum is desirable to produce bars which are the least subject to dry cracking. However, vacuum need not be used. When vacuum is used, the amount of vacuum usually ranges from about 25 inches of mercury to about 29 inches of mercury (that is, the absolute pressure ranges from about 5 inches of mercury to about 1 inch of mercury).

The noodles in the common stream fall as result of gravity into hopper 44 where a bed of noodles (intermingled with respect to color) builds up. This bed ordinarily has a vertical dimension ranging from about 2 inches to about 20 inches, preferably from about 6 inches to about 12 inches.

From such bed, the noodles are choke fed through the restricted opening of outlet 50 of hopper 44 into final plodder 46. The constraining apparatus in the form of the restricted opening has the effect of restricting lateral and longitudinal motion in the bed thereby contributing to the consistent variegation results and other benefits as aforestated.

In final plodder 46, the noodles are compacted and extruded to form a variegated soap log 53. The temperature of the soap log 53 extruded from plodder 46 is preferably controlled to range from about 85° to about 105° F by means of a cooling jacket adjacent the plodder outlet through which brine or other cooling agent is circulated. While temperatures between 85° and 105° F are preferred, temperatures have risen to 115° F or higher without deleterious result. Rates through plodder 46 typically range from 40 to 90 lbs/minute, with 60 to 75 lbs/minute being preferred. In usual operation, the soap log extrudes from the nozzle of the plodder at pressures ranging from about 100 to about 350 lbs/sq.in., preferably ranging from about 150 to about 250 lbs/sq.in.

Figure 7:
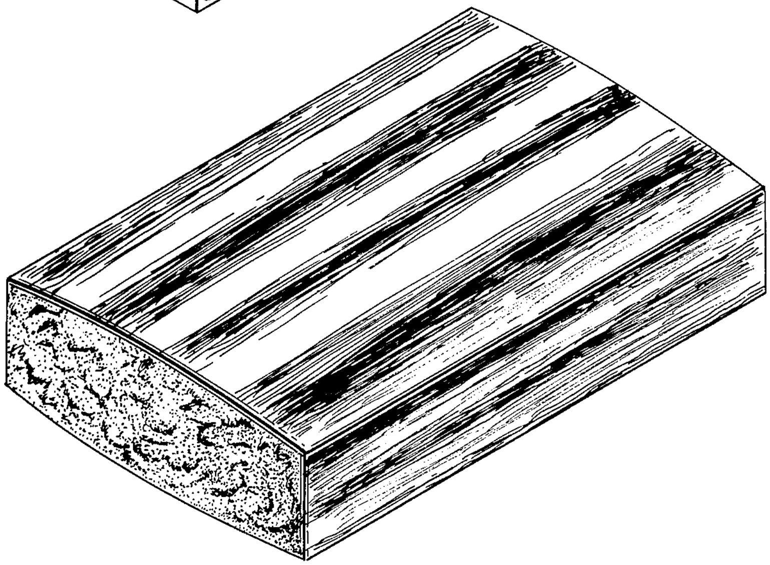
FIG. 7 is a perspective view of a portion of a soap log made utilizing apparatus and process as illustrated in FIGS. 1–5 and illustrates a typical pattern of variegation at the surface of the log and at a cross section taken in the cross machine direction.

The log 53 emanating from outlet 52 of plodder 46 is cut by means 56 into billets having a size related to the size of the bars to be produced. FIG. 7 illustrates a billet produced by a cutting step and illustrates the variegation pattern at the major surfaces of a billet and at the ends of a billet (at a transverse cross section of the log).

Figure 8:
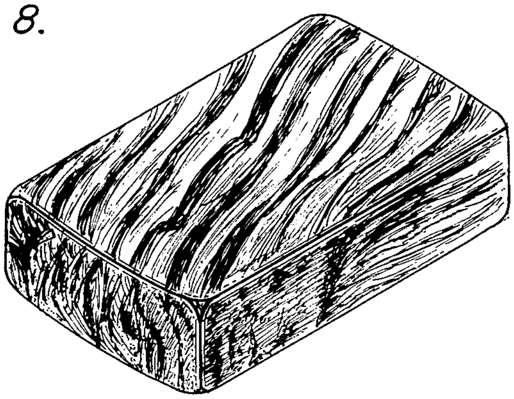
FIG. 8 is a perspective view of a soap bar illustrating a pattern of variegation obtained utilizing apparatus and process within the scope of this invention.

A billet produced by the cutting step can be converted into a soap bar using any conventional stamping means 58, for example a conventional stamping procedure comprising aligning each billet with a die box cavity so as to have a longitudinal axis coincident with the longitudinal axis of the die box cavity, forcing the aligned billet into the die box cavity to form a bar within the cavity and releasing the bar from the cavity. Preferably a diagonal stamping procedure is utilized, such as those described or referenced in patent application Ser. No. 546,053 mentioned previously; in a preferred method described in Ser. No. 546,053 a billet is aligned with a substantially rectangular die box cavity so as to have a longitudinal axis not coincident with the longitudinal axis of the die box cavity. FIG. 8 depicts a tyical soap bar produced within the scope of the invention wherein the processing included a diagonal stamping procedure.

We turn now to processing utilizing apparatus described above in conjunction with FIG. 6. The processing conditions are the same as those described above except that the noodles produced by the two noodle producing assemblies (each comprising a preplodder, a perforated plate and a rotatable knife edge) are not intermingled. Instead the noodles produced by the assembly including preplodder 12 are guided by a chute (not depicted) to form a stream entering channel 64 and the noodles formed by the assembly including preplodder 24 are guided by a chute (not depicted) into channel 66 (in other words, to form side-by-side streams with each stream of the side-by-side streams being of noodles of one of the colors) to thereby form a bed of noodles in channel 64 consisting of noodles of one color and a bed of noodles in channel 66 consisting of noodles of a second color (in other words, to form side-by-side beds of noodles, physically segregated from each other by divider 62, with noodles of one color in one bed and noodles of a second color in the other bed). Each bed has a vertical dimension the same as that described above where a single bed is formed. Feeding from the restricted opening is carried out simultaneously from the two beds so that noodles of both beds are choke fed into the final plodder. The billets produced as a result of cutting are similar to the one depicted in FIG. 7 except that at the ends of a billet (that is at a transverse cross-section of the soap log) there is a spiraling pattern with the color of the noodles fed into channel 64 being more toward the outside of the bar and the color of the noodles fed through channel 66 being in the spiraling pattern toward the central portion of the bar as seen at the ends of the billet.

We turn now to the specific examples which are included to illustrate the inventive concepts herein.

EXAMPLE I

The apparatus utilized is that depicted in FIGS. 1–5 of the drawings. The preplodders are each equipped with a cooling jacket. The plate 18 has a 10 inch diameter and contain perforations of diameter of about ½ inch. The plate 30 has a 10 inch diameter and contains perforations of diameter of about ⅛ inch. The final plodder has a worm diameter of about 16 inches and a flight distance of about 9¾ inches. The outlet from hopper 44 is designed to provide a stream of noodles into plodder 46 which is rectangular in cross section. The outlet 50 from hopper 44 has a dimension in the cross machine direction (with respect to final plodder 46) of about 8 inches and a dimension in the machine direction (with respect to plodder 46) of about 9¾ inches.

A soap mass in the form of white chunks having the following composition by weight is fed into perplodder 12:

| | |
|---|---|
| Tallow and Coconut Sodium Soaps at 50% each by weight | 78.5% |
| Coconut Fatty Acid | 7.0% |
| Water | 11.0% |
| NaCl | 1.1% |
| Sanitizer | .5% |
| Perfume | 1.6% |
| Misc. and $TiO_2$ Whitener | Balance to 100.00% |

A soap mass in the form of blue chunks having a composition similar to that set forth in the above paragraph is fed into preplodder 24.

Both the white and blue soap masses enter the respective preplodders a temperature of about 90° F.

The preplodder 12 compacts the white soap chunks and extrudes the compacted chunks through the perforations in plate 18. Knife edge 20 is rotated to produce white noodles of diameter of about ½ inch and length of about ¾ inch. Cooling fluid is circulated through the cooling jacket of preplodder 12 to maintain the temperature of the extruded noodles at about 90° F.

The preplodder 24 compacts the blue soap chunks and extrudes the compacted chunks through the perforations in plate 30. Knife edge 32 is rotated to produce blue noodles of diameter of about ⅛ inch and length of about 1½ inch. Cooling fluid is circulated through the cooling jacket of preplodder 24 to maintain the temperature of the extruded noodles at about 95° F.

Soap masses are fed by conveyors 10 and 22 and the preplodders 12 and 24 are run so that the weight ratio of white noodles to blue noodles produced is about 3½ to 1.

The white and blue noodles are guided into a common stream by chutes 40 and 42 and are intermingled and the intermingled noodles fall by gravity to form a bed of noodles about 10 inches deep in hopper 44. Noodle feed is continued by conveyors 10 and 22 to maintain that approximate bed depth. A vacuum of 27 inches of mercury is drawn on conduit 34 through conduit 36.

The restricted opening into the final plodder has the effect of restricting lateral and longitudinal motion in the noodle bed in hopper 44.

The final plodder is choke fed from that noddle bed at a rate sufficient to provide a throughput of about 65 pounds per minute. Feed rates from conveyors 10 and 22 are consistent with this throughput rate. The stream of noodles entering the plodder 46 has a rectangular cross section with a dimension in the cross machine direction (with respect to plodder 46) of about 8 inches and a dimension in the machine direction (with respect to plodder 46) of about 9¾ inches.

In plodder 46, the worm 48 rotates to compact the intermingled noodles and extrude the same into a soap log having a variegated appearance. The soap log 53 extrudes from the nozzle of the plodder at a pressure of about 160 lbs/sq.in.

The soap log is cut into billets of approximately the length of the soap bars to be produced. The billets are stamped into bars by a diagonal stamping procedure as described above.

The bars produced are essentially uniform in appearance, that is the appearance of the variegation pattern from bar to bar is essentially the same. The bars are produced without a smeared appearance and with a muted color tone and the need for operator adjustment (for example of brine flow) to obtain these results is at a minimum.

EXAMPLE II

Example I is duplicated except the plate 18 has perforations of about ⅛ inch diameter and the perforated plate 30 has perforations of about ½ inch diameter and the apparatus is run so that the white noodles are cylindrical and have a diameter of about ⅛ inch and a length of about 1½ inch and the blue noodles are cylindrical and have a diameter of about ½ inch and a length of about ¾ inch. The results produced are essentially the same as those produced in Example I.

EXAMPLE III

Example I is duplicated except that the perforated plates 18 and 30 both have perforations with diameters of ¼ inch, and all the noodles are cylindrical and have diameters of about ¼ inch and lengths of about 1 inch. The results produced are essentially the same as those in Example I.

EXAMPLE IV

The apparatus utilized is the same as that in Example I except that the hopper utilized is that depicted in FIG. 6 (with the longitudinal divider positioned so that the ratio obtained by dividing the horizontal cross sectional area of channel 64 by the horizontal cross sectional area of channel 66 is 3½:1 and the chutes 40 and 42 are repositioned so that the chute 40 feeds white noodles into channel 64 and so that the chute 42 feeds blue noodles into channel 66. The processing is the same as in Example I except that a bed of white noodles is formed in channel 64 and a bed of blue noodles is formed in channel 66 and the final plodder 46 is choke fed from the two beds. Consistency of variegation, muted color tone and lack of smearing results essentially the same as those produced in Example I are produced herein.

The invention maybe embodied in other specific forms without departing from the essential characteristics thereof.

For example, the feed device into the final plodder need not be a hopper. In other words a continuation or part of the "vacuum chamber" can serve the function of providing a bed of noodles for feeding the final plodder; the only requirement is that the outlet from the conduit into the final plodder be of the restricted nature described previously, that is, be designed to communicate essentially only with a portion of the worm of the plodder means which turns downwardly on rotation of such worm so as to restrict lateral and longitudinal motion in the bed or beds of noodles. Moreover the apparatus as depicted in FIGS. 1–5 can be utilized except that chutes 40 and 42 are positioned to form side-by-side streams without intermingling of noodles of one color with noodles of a second color and to form a bed with noodles of one color to one side and noodles of another color on the other side; in other words the effect of the FIG. 6 apparatus can be essentially realized using a hopper or feed conduit without a divider member. In view of the variations that are readily understood to come within the limits of the invention, such limits are defined by the scope of the claims.

The term "soap" is used herein in its broad sense unless the context indicates otherwise. In other words, it includes compositions capable of being plodded to form a final bar which contain true soap or which contain other detersive surfactant materials or which contain mixtures of these. Such compositions are wall known in the art. Preferred ingredients for such compositions are water soluble soaps including sodium, potassium, ammonium and alkanolammonium (e.g., mono-, di-, triethanolammonium) salts of higher fatty acids (e.g. $C_{10}$–$C_{24}$) as a major component, especially fatty acids derived from coconut oil and tallow (i.e. sodium and potassium tallow and coconut soaps, for example in weight ratios of tallow to coconut soap ranging from 95:5 to 5:95). Such compositions preferably are those which comprise from about 40 to about 90% by weight tallow soap and/or those which comprise from about 10 to about 60% coconut soap. The other detersive surfactant materials mentioned above are well known and include anionic, nonionic, cationic, amphoteric and ampholytic surfactants and compatible combinations thereof; typical of such surfactants are the organic detergents listed at column 8, lines 27–75 and column 9, lines 1–75 and column 10, lines 1–52 of U.S. Pat. No. 3,714,151 issued Jan. 30, 1973 to W. I. Lyness and commonly assigned herewith. Such compositions typically contain additives and adjuvants. Such additives and adjuvants include free fatty acid, perfumes, bacteriostats, sanitizers, whiteners, abrasives, emollients, etc. Such compositions typically contain moisture content of from about 8 to about 14% water, and salt content of from about 0.1 to about 2% sodium chloride.

The term "soap mass" is utilized herein to mean a composition as described in the above paragraph in a form suitable for use with a preplodder. The soap mass can be prepared through conventional milling and optional plodding steps well known in the art.

I claim:

1. Apparatus for production of variegated soap bars, said apparatus comprising:
- (a) means to form soap noodles of one color;
- (b) means to form soap noodles of a second color;
- (c) means to receive the noodles from means (a) and means (b) to form a common stream of noodles;
- (d) plodder means having a rotatable worm to process the noodles into a variegated soap log;
- (e) means for forming the soap log into variegated soap bars;
- (f) means for receiving noodles from the means (c) and providing a bed of noodles for choke feeding of the plodder means and having outlet means for communicating essentially only with a portion of the worm of the plodder means (d) which turns downwardly on rotation of such worm.

2. Apparatus as recited in claim 1, in which the means (f) has outlet means for restricting lateral and longitudinal motion in the bed.

3. Apparatus as recited in claim 2 in which the outlet means in the means (f) has an opening with a dimension in the cross machine direction in respect to the plodder means of no more than about 1.1 times the radial dimension of the worm.

4. Apparatus as recited in claim 2 in which the outlet means in the means (f) has an opening in the form of a right parallelogram having a dimension in the machine direction in respect to the plodder means ranging from about one-half the flight distance to about twice the flight distance and a dimension in the cross machine direction in respect to the plodder means ranging from about one-half the radial dimension of the worm to about 1.1 times the radial dimension of the worm.

5. Apparatus as recited in claim 4 in which the outlet means of the means (f) is positioned and the opening of said outlet means is dimensioned so as to provide a feed stream into the plodder means having a horizontal cross section which is rectangular and has a dimension in the machine direction of the plodder means of one times the flight distance and a dimension in the cross machine direction of the plodder means equal to the radial dimension of the worm.

6. Apparatus as recited in claim 2 in which means (c) comprises chute means having an inlet communicating with means (a) and chute means having an inlet communicating with means (b) with the chute means being positioned to guide the noodles to form the common stream of noodles.

7. Apparatus for production of variegated soap bars, said apparatus comprising:
- (a) means to form soap noodles of one color;
- (b) means to form soap noodles of a second color;
- (c) means to receive noodles from means (a) and means (b) and to form side-by-side streams of noodles with each stream of the side-by-side streams being of noodles of one of the colors;
- (d) plodder means having a rotatable worm to process the noodles into a variegated soap log;
- (e) means for forming the soap log into variegated soap bars;
- (f) means for receiving noodles from the means (c) and providing at least one bed of noodles for choke feeding of the plodder means and having outlet means providing communication essentially only with a portion of the worm of the plodder means which turns downwardly on rotation of such worm.

8. Apparatus as recited in claim 7 wherein means (f) provides a single bed of noodles for choke feeding of the plodder means and in which the outlet means in the means (f) has an opening with a dimension in the cross machine direction in respect to the plodder means of no more than about 1.1 times the radial dimension of the worm.

9. Apparatus as recited in claim 7 in which the outlet means in the means (f) has an opening in the form of a right parallelogram having a dimension in the machine direction in respect to the plodder means ranging from about one-half the flight distance to about twice the flight distance and a dimension in the cross machine direction in respect to the plodder means ranging from about one-half the radial dimension of the worm to about 1.1 times the radial dimension of the worm.

10. Apparatus as recited in claim 9 in which the outlet means of the means (f) is positioned and the opening of said outlet means is dimensioned so as to provide a feed stream into the plodder means having a horizontal cross section which is rectangular and has a dimension in the machine direction of the plodder means of one times the flight distance and a dimension in the cross machine direction of the plodder means equal to the radial dimension of the worm.

11. Apparatus as recited in claim 7 in which the means (f) includes divider means which extends in a longitudinal direction to form side-by-side channels into the plodder means with one of the channels functioning to receive noodles from means (a) and the other of the channels functioning to receive noodles from means (b).

12. Process for manufacture of variegated soap bars, said process comprising:

(a) providing a soap mass of one color;

(b) providing a soap mass of a second color;

(c) plodding the soap mass of the one color to compact and extrude the same and form noodles;

(d) plodding the soap mass of the second color to compact and extrude the same and form noodles;

(e) directing the noodles to form a common stream to provide one bed of noodles;

(f) feeding noodles downwardly from said bed into a plodding means while restricting lateral and longitudinal motion of noodles in said bed by use of a hopper means which feeds said noodles onto essentially only the downwardly-turning portion of the worm of said plodding means;

(g) plodding the noodles fed downwardly from said bed to compact and extrude the same and form a variegated soap log;

(h) forming the log into variegated soap bars.

13. Process for manufacture of variegated soap bars, said process comprising:

(a) providing a soap mass of one color;

(b) providing a soap mass of a second color;

(c) plodding the soap mass of the one color to compact and extrude the same and form noodles;

(d) plodding the soap mass of the second color to compact and extrude the same and form noodles;

(e) directing the noodles to form side-by-side streams to provide a separate bed of noodles from each respective stream;

(f) feeding noodles downwardly from each bed into a plodding means while restricting lateral and longitudinal motion of noodles in each bed by use of a hopper means which choke feeds said noodles onto essentially only the downwardly-turning portion of the worm of said plodding means;

(g) plodding the noodles fed downwardly from each bed to compact and extrude the same and form a variegated soap log;

(h) forming the log into variegated soap bars.

* * * * *